(12) United States Patent
Luzzini et al.

(10) Patent No.: US 12,371,636 B2
(45) Date of Patent: Jul. 29, 2025

(54) LIQUID WASHING COMPOSITION WITH SEPARATE COMPONENTS FOR LAUNDRY AND KIT THEREOF AND WASHING METHOD FOR AUTOMATIC WASHING MACHINES

(71) Applicant: SALROS S.R.L., Milan (IT)

(72) Inventors: Paola Luzzini, Milan (IT); Ivana Rovelli, Milan (IT); Elisa Zacchi, Milan (IT)

(73) Assignee: SALROS S.R.L., Milan (IT)

( * ) Notice: Subject to any disclaimer, the term of this patent is extended or adjusted under 35 U.S.C. 154(b) by 344 days.

(21) Appl. No.: 17/780,770

(22) PCT Filed: Nov. 26, 2020

(86) PCT No.: PCT/IB2020/061179
§ 371 (c)(1),
(2) Date: May 27, 2022

(87) PCT Pub. No.: WO2021/105919
PCT Pub. Date: Jun. 3, 2021

(65) Prior Publication Data
US 2022/0411721 A1      Dec. 29, 2022

(30) Foreign Application Priority Data

Nov. 28, 2019   (IT) .................. 102019000022392

(51) Int. Cl.
*C11D 1/86*   (2006.01)
*C11D 1/02*   (2006.01)
(Continued)

(52) U.S. Cl.
CPC ............. *C11D 1/86* (2013.01); *C11D 1/02* (2013.01); *C11D 1/14* (2013.01); *C11D 1/22* (2013.01);
(Continued)

(58) Field of Classification Search
CPC ...... C11D 1/86; C11D 3/0005; C11D 3/38618; C11D 3/38627; C11D 3/48; C11D 3/0015
See application file for complete search history.

(56) References Cited

U.S. PATENT DOCUMENTS

2003/0027740 A1 * 2/2003 Weuthen ............... C11D 1/825
510/447
2003/0127110 A1 * 7/2003 Reichold ............ A47L 15/4418
134/25.2
(Continued)

FOREIGN PATENT DOCUMENTS

CN      108951007      12/2018
EP      2521811        11/2012
(Continued)

OTHER PUBLICATIONS

International Search Report for PCT/IB2020/061179, mailed Feb. 9, 2021, 4 pages.
(Continued)

*Primary Examiner* — Mark Eashoo
*Assistant Examiner* — M. Reza Asdjodi
(74) *Attorney, Agent, or Firm* — NIXON & VANDERHYE (57) ABSTRACT

A fluid washing composition with four separate components and laundry washing kit thereof is disclosed. The four components are housed in respective independent tanks of a laundry washing machine equipped with a program for selecting, dosing and differentiated delivering. Component 1 is a detergent formulation with a pH of 4.0-12.0, with high detergent effect in washing programs at temperatures of 40°-60° C., having a specific action on cotton fibers, particularly, whites. Component 2 is a detergent formulation with a pH of 8.0-12.0, with high detergent effect in washing programs at temperatures of 15°-40° C., having a specific action on synthetic, colored and animal-origin fibers. Com- (Continued)

ponent 3 is an enzyme-based stain-removing formulation including protease and lipase and possibly amylase with a pH of 5.0-6.0, stabilized with sorbitol and calcium chloride. Component 4 is an after-wash conditioning formulation, with a pH of 2.0-4.0.

16 Claims, 1 Drawing Sheet

(51) Int. Cl.

| | | |
|---|---|---|
| C11D 1/14 | (2006.01) | |
| C11D 1/22 | (2006.01) | |
| C11D 1/62 | (2006.01) | |
| C11D 1/66 | (2006.01) | |
| C11D 1/72 | (2006.01) | |
| C11D 1/83 | (2006.01) | |
| C11D 3/00 | (2006.01) | |
| C11D 3/20 | (2006.01) | |
| C11D 3/22 | (2006.01) | |
| C11D 3/386 | (2006.01) | |
| C11D 3/48 | (2006.01) | |
| C11D 11/00 | (2006.01) | |

(52) U.S. Cl.
CPC ............... *C11D 1/62* (2013.01); *C11D 1/662* (2013.01); *C11D 1/72* (2013.01); *C11D 1/83* (2013.01); *C11D 3/0005* (2013.01); *C11D 3/0015* (2013.01); *C11D 3/0036* (2013.01); *C11D 3/0068* (2013.01); *C11D 3/2065* (2013.01); *C11D 3/225* (2013.01); *C11D 3/38618* (2013.01); *C11D 3/38627* (2013.01); *C11D 3/38636* (2013.01); *C11D 3/38645* (2013.01); *C11D 3/38663* (2013.01); *C11D 3/48* (2013.01); *C12Y 304/21062* (2013.01); *C11D 2111/12* (2024.01)

(56) References Cited

U.S. PATENT DOCUMENTS

| | | | | |
|---|---|---|---|---|
| 2006/0258556 | A1* | 11/2006 | Holderbaum | C11D 17/0078 510/447 |
| 2008/0028802 | A1* | 2/2008 | Jordan | D06F 39/02 222/394 |
| 2008/0276969 | A1* | 11/2008 | Vanantwerp | D06F 39/02 134/25.1 |
| 2010/0056647 | A1* | 3/2010 | Graham | C11D 3/001 510/475 |
| 2010/0056649 | A1* | 3/2010 | Henning | C08G 77/12 556/451 |
| 2013/0036772 | A1* | 2/2013 | Brueckner | D06F 39/02 68/17 R |
| 2014/0250608 | A1* | 9/2014 | Walker | C11D 17/041 206/223 |
| 2019/0048291 | A1* | 2/2019 | Gori | C12N 9/22 |
| 2019/0136162 | A1* | 5/2019 | Cooke | C11D 3/38636 |
| 2019/0290049 | A1* | 9/2019 | Jantschke | A47J 31/407 |
| 2022/0411721 | A1* | 12/2022 | Luzzini | C11D 3/0005 |

FOREIGN PATENT DOCUMENTS

| | | |
|---|---|---|
| EP | 2566943 | 3/2013 |
| WO | 96/15710 | 5/1996 |
| WO | 2013/054089 | 4/2013 |
| WO | 2017/211697 | 12/2017 |

OTHER PUBLICATIONS

Written Opinion of the ISA for PCT/IB2020/061179, mailed Feb. 9, 2021, 7 pages.
International Preliminary Report on Patentability with Amended Claims for PCT/IB2020/061179, mailed Mar. 15, 2022, pages.

* cited by examiner

LIQUID WASHING COMPOSITION WITH SEPARATE COMPONENTS FOR LAUNDRY AND KIT THEREOF AND WASHING METHOD FOR AUTOMATIC WASHING MACHINES

CROSS-REFERENCE TO RELATED APPLICATIONS

This application is the U.S. national phase of International Application No. PCT/IB2020/061179 filed Nov. 26, 2020, which designated the U.S. and claims priority to IT Patent Application No. 102019000022392 filed Nov. 28, 2019, the entire contents of each of which are hereby incorporated by reference.

BACKGROUND OF THE INVENTION

Field of the Invention

The presented invention refers to a liquid washing composition comprising a plurality of separate concentrated components. The composition is meant for laundry washing in automatic washing machines, equipped with independent tanks for each of said separate components of the washing composition, as well as with a programme for the selection and measurement of the various separate components of the washing composition, depending on the variable features of the individual laundry required by the user.

The washing composition is arranged so that the various separate components can be introduced into the washing chamber of the washing machine, in preset times of the washing cycle, by means of suitable selection, measurement and delivery devices which said washing machine is equipped with.

Here and in the following, by the term "liquid washing composition with separate components" a composition is meant consisting of at least two liquid-phase components which are used, simultaneously and/or in sequence, in performing a full laundry washing cycle in a washing machine, in order to obtain the washing and the subsequent conditioning of the fibres of the washed items.

Description of the Related Art

Domestic laundry, in developed markets, is by now performed almost exclusively with the support of a washing machine.

For such machines, suitable detergent products have existed on the market for a long time, which have a, fluid or powder-like, complex universal formula, to be able to be introduced into the washing chamber of the machine manually or by means of delivery devices with automatic programming.

However, the consumer often finds himself or herself having to wash items made with special materials, for which all-purpose detergents are little effective and/or harmful to fibres.

In the market of domestic laundry detergents a number of types of products have hence expanded with optimised performances for specific groups of fabrics and/or of colours of the items.

Most consumers, in order to meet all their requirements, is thus forced to purchase and use multiple products: for example for white items, coloured items, woolen items, synthetic items or sports items.

On the other hand, the use of a single product might instead represent, on the one hand, a possible risk of damaging the items consisting of more delicate fibres, which as a matter of fact are remarkably deteriorated by the products with a higher detergent and bleaching effect or, on the other hand, a reduced effectiveness for the less delicate items with stubborn dirt stains.

This first group of detergent products is furthermore extended by other types of products which are used to perform specific functions during washing, such as stain removers for the removal of the most stubborn stain or of stains of an organic nature, softeners, fragrances or specific additives for the conditioning of natural fibres.

If this multiplicity of washing products, on the one hand, allows the carrying out of an effective wash for the different types of fabric and of dirt, it naturally implies, on the other hand, some drawbacks, such as: a greater complexity of supply by the consumer, a greater bulk in the domestic rooms where the washing is carried out, a certain skill in the ways of use, a non optimal prolonged conservation, with a resulting loss of washing effectiveness, especially of the enzyme components of the detergents and, finally, the risk of using incorrect products when the stocks available are not complete and there is nevertheless the urgency of carrying out a laundry wash.

Another drawback of this conventional mode of using the laundry washing products derives from the fact that the washing of laundry is today performed with a much higher frequency than in the past: the cases in which a high washing power is necessary are hence ever less frequent. Some ingredients of the detergents on the market are hence overdosed with respect to the requirements of the usual laundry and hence uselessly increase the environmental impact of the products.

Moreover, it must be noted that the highest degreasing effectiveness of each individual surfactant which forms the detergent occurs in a well-defined field of different temperatures: therefore, the all-purpose washing product compositions, available on the market, which must be capable of performing a washing activity across the whole field of possible temperatures for the different items to be washed, must necessarily comprise multiple surfactants; thereby, however, part of those surfactants can prove to be of poor or no use, based on the temperature of the washing programme chosen by the consumer, and hence represents a useless waste.

In order to address these different problems, washing machines equipped with multiple separate tanks have recently started to expand in the market, wherein individual concentrated components are arranged, simpler and having each a different function. This partition hence allows a high number of washing cycles, wherein the dosing of the different components is carried out automatically, also at different times of the washing cycle (a known and already widespread example, is that of Miele's washing machines TwinDos®), calibrating it based on the type of wash carried out and on the type of items to be washed. The individual components can thus be used in a correct amount, without requiring any random intervention of the user, obtaining an optimised effectiveness for the individual washing cycle.

Documents CN-108951007, DE-102016106777, WO-2015/143820, EP-2566943, EP-2524079, EP-2196574, EP-1995368, U.S. Pat. No. 7,784,310, EP-474848 disclose solutions of washing machines or of methods of use of washing machines, which provide a plurality of tanks of separate wash components, which are automatically dosed during successive washing cycles.

As regards the particular type of washing composition with separate components used in said washing machines with multiple tanks, the current prior art is represented, exemplifyingly, by the documents which are briefly commented in the following.

WO 2017/211697 discloses a washing composition provided in a combination of tanks to address enzymatic compatibility problems; the composition is divided into a first tank with a component which contains an enzymatic protease base, a second tank with a component containing an enzymatic lipase and/or a cellulase base and a third tank containing a detergent. Alternatively, the detergent can be additioned to the first or to the second tank.

EP 2521811 and the corresponding US2013036772A1 discloses a washing machine comprising an external multiple tank connected to the internal drum of the washing machine. The multiple tank comprises a first tank which contains at least an enzyme, a stabiliser for enzymes and a surfactant, that is a formulation typical of a conventional detergent; a second tank which contains at least a bleach and a complexing agent, which in turn is a known stain-removing and sanitising formulation; and a third tank containing at least a fragrance and/or an optic bleaching agent and/or a softener. The specific compositions disclosed here do not have an innovative formulation and simply represent an example of different complex washing agents, which are delivered according to requirements. The complex contents of each tank is delivered in certain conditions, but does not allow to effectively built a formulation optimising the amounts of the ingredients. It must furthermore be noted that one of the components contains both enzymes and surfactants which are hence delivered together in the washing cycle: that is not different from the previous art of a common detergent, wherein the two ingredients are defined a priori and the modulation of which is not possible in use: that does hence overcome the limit of the waste of (costly) enzymes in many cases in which they are not necessary and makes such component useless in the presence of materials based on animal-origin proteins (such as wool and silk) which are deteriorated by the enzymes. Finally, the division of the separate components into three compartments, with the components in a 1:4:1 ratio (where the largest amount is for the alkaline bleaching agent), is not consistent with the washing requirements (for which a larger amount of surfactants and solvents is typically necessary) and hence produces an improper use of the available volumes, not being suitable for the application in any delivery system for washing machines. In particular, a solution as illustrated in EP3623524, where it is necessary to integrate the components in tanks housed in a circular sector of the porthole of a washing machine, the division into three components is not optimal for the exploitation of the space in view of the average type of the items to be washed. It must moreover be considered that the washing machine porthole transfers part of the washing heat to the tanks of the washing formulation, which are hence no longer in a neutral environment (as can occur if the tanks are arranged above the washing machine). EP 2521810 discloses a washing machine comprising a multiple external tank connected to the washing machine inner drum. The multiple tank comprises a first tank which contains at least an enzyme selected by the group of amylase, mannanase, cellulase, lipase and/or pectate lyase and at least a surfactant agent and/or a complexing agent; a second tank which contains at least a protease and a surfactant and/or complexing agent; and a third tank containing at least a fragrance and/or an optical bleaching agent and/or a softener.

WO 2009/95003 discloses a washing machine comprising a multiple tank wherein each individual type of washing component is housed in a respective tank. Thereby the harmful interactions between different types of enzymes are fully avoided and the dosing of each individual component can be made in an accurate manner; however, the remarkable drawback of having to manage a high number of different tanks exists, both from the bulk point of view, and from that of the frequency and mode of re-charging.

From the framework of the above reported prior art it evidently appears how in the compositions with prior art separate components inefficiencies remain. In particular, the splitting of the components is effective only in the cases in which it is possible to manage a large number of separate tanks, while the splitting implies compromises which make the wash inefficient and little flexible when one chooses a partition into only three separate tanks.

In particular, the solutions which suggest to assign each family of enzyme to a respective tank, as proposed in WO 2009/9503, suffer the already above described drawback of too large a number of tanks for a good efficiency of the system and for the swift acceptability thereof by consumers, which as a matter of fact would not see therein a sufficient advantage with respect to the current situation of use of a plurality of washing compositions suited for each specific laundry situation. In the solutions instead in which it is suggested to associate each family of enzymes with other components of the washing composition with which no harmful interaction effects occur, for example surfactant, bleaching agents or softening agents—as proposed for example in EP 2521811—it is indeed possible to maintain the number of different tanks reasonably low, but the drawback is suffered of not being able to dose independently the enzymes and the components associated therewith, thus determining an inevitable waste of the overdosed component.

These problems are furthermore heightened in the cases in which the individual tanks have dimensional constraints because they must be housed in compartments of a preset geometry, as proposed in EP3623524.

SUMMARY OF THE INVENTION

The objects at the basis of the present invention are hence those of providing a washing composition with separate components which allows to dose independently the main components of the composition in a wide spectrum of different possible washing conditions, despite maintaining an overall reasonably low number of separate components and relative quantities among the various components which are suitable to arrange independent tanks which optimise the available space in a circular sector of a washing machine porthole. The invention has also the object of reducing to a minimum the amount in terms of overall volume of the ingredients, in order to increase up to 75 washing cycles (with an average laundry load of 4.5 kg) the independence of the washing machine with no need to reload the components, so as to reduce the use of plastic materials for the packaging for washing unit and the resulting environmental impact.

Finally, a further object is that of proposing a group of components which is particularly suited to maintain a good effectiveness over time even in critical temperature conditions, as can be found in contact with a porthole of a washing machine during the exposure to the various hot washing cycles.

These objects are achieved by means of a washing composition with multiple separate components having the features, together with other preferred features of said washing composition are disclosed and claimed herein.

In particular, the present invention consists in the formulation of a washing composition to treat all the possible items of clothing and other textile items of familiar use, made of any type of natural or synthetic fabric and in any condition of dirt or of stains.

According to the present invention such washing composition consists of four separate components in a liquid phase, which are sold to the consumer in respective containers and which when they are used in a washing machine in combination with one another according to predefined amounts, variable according to the type of fabric, to the dirt degree or to the presence of stains, allow to optimally wash and treat any type of fibre and of item, without the addition or the alternative use of some other washing product, stain remover or softener becoming necessary, thus guaranteeing the universality of the solution proposed for solving the problem of an effective domestic laundry.

The integration of the washing composition with separate components of the present invention in a washing machine equipped with an automatic dosing system, it is hence capable of allowing a dramatic reduction not only of the number of products which must be used for the laundry, but also of the domestic areas meant to preserve the stocks of such products.

BRIEF DESCRIPTION OF THE DRAWING

Further features and advantages of the invention will in any case be more evident from the following detailed description of a preferred embodiment of the same, provided purely as a non-limiting example and illustrated also in the attached drawing which represents a diagrammatic view of a washing machine porthole with four tanks for the components according to the invention.

DETAILED DESCRIPTION OF PREFERRED EMBODIMENTS

In order to solve the above highlighted problem, the Applicant has carried out wide studies on the stability of the enzymes during preservation and on the opportunity to optimise the division and the amounts of the different washing components, in view of the need to treat different materials with no waste and to occupy a constrained space in a circular sector compartment.

Figure 1:
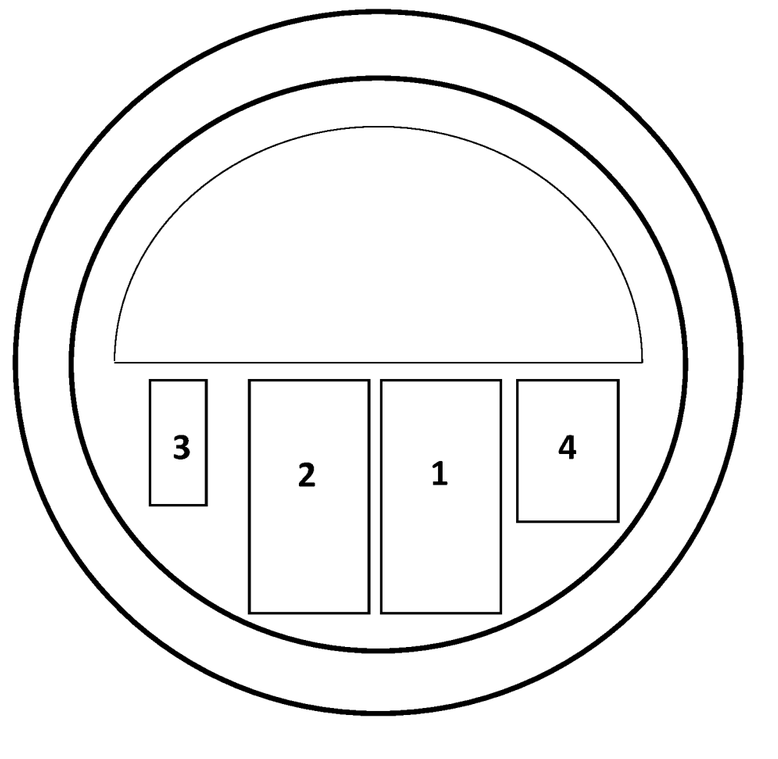

At the end of such experimentation, it has been detected that a division into four different components allowed to optimally occupy a circular section compartment (FIG. 1) with differentiated volumes of the components 1, 2, 3, 4 shown in FIG. 1 in the ratios from 5:4:1:2 to 4:3:1:3, respectively, preferably in the ratio 4,2:3,3:1:2,5.

It has been furthermore highlighted that in particular pH conditions it was possible to maintain in a stable mixture enzymes of different families, and in particular protease and lipase, without significant activity losses.

The outcome of these studies has allowed to overcome the above-described state of the art, devising a liquid washing composition wherein all the necessary enzymes were collected into a single component. This has allowed to use the other components in an innovative way, separating the surfactants into two components, depending on the optimal field of activity temperatures thereof, on the compatibility thereof with the fibres and adding a fourth component for the final conditioning of the fibres, thus devising the liquid washing composition with separate components of the present invention.

As a matter of fact, thereby it is possible to leave in a single container of a reduced volume (the volume of component 3 of FIG. 1) the two enzymes based on protease and lipase and the others possibly deemed necessary in order to optimise the stain-removing power, occupying the entire container volume available and transferring the surfactant component in separate independent containers of a larger volume. That allows to better distribute (compared to the known art) the various components across four different and independent volumes, advantageously separating the components (typically enzymes and surfactants) which must preferably be used in different washing conditions.

The four separate components which make up the liquid washing composition of the present invention hence have the following general formulations:

Component 1—washing formulation with a pH ranging between 4.0 and 12.0, having a specific action on cotton items and in particular white items;

Component 2—washing formulation with a pH ranging between 8.0 and 12.0, having a specific action on synthetic, coloured and animal-origin fibres;

Component 3—enzyme-based, stain-removing formulation with a pH ranging between 4.0 and 6.0;

Component 4—formulation for fibre conditioning at the end of the washing operation, with a pH ranging between 1.0 and 4.0.

Components which occupy the respective volumes referred to as 1, 2, 3 and 4 in FIG. 1.

As schematised in FIG. 1, the components are contained in cartridges in a concentrated form and in an amount sufficient for carrying on a number of washing cycles ranging between 50 and 100, taking into account the average frequency of use thereof, with a higher-than-average effectiveness of the conventional liquid washing products present on the market.

The four cartridges 1-4 of the washing composition of the invention are installed on a special washing machine, equipped with a receiving seat with separate drawing units for the four cartridges (as described in EP3623524). The machine is furthermore equipped with an automatic and independent drawing and dosing system of the four components, with a software programme which defines the respective dosing of the individual components, depending on the selections as to the type of dirt and to the type of fabric made by the user. The lid cap of the containers represents itself the connection to the distribution line provided onboard the machine and is equipped with a venting system for the balancing of the inner pressure.

The invention is based on the experimental observation that it is possible to maintain the stability and the relative washing effectiveness of the enzymes of the lipase category in a mixture with some types of protease enzymes, when these enzymes are inserted in a formulation having a pH lower than a 6.0 and furthermore using a specific mixture of solvents. Preferably the formulation pH must be greater than 4 and even more preferably greater than 5.

In particular, due to the possible housing of the containers of the ingredients in a position potentially exposed to temperature rise during washing cycles, the stability upon time must be guaranteed not only at 37° C., a temperature typically identified in the sector as a parameter of a limit temperature connected with standard storing conditions of a detergent, but even up to about 40° C.

The separation of this component—identified as above as a third component—with respect to those containing washing surfactants, allows accurate dosing only upon need and compatibly with the type of fabric to be treated. The enzymes maintained in a single container without other washing components have available a greater volume which makes thus feasible a greater dosing of this third component in the time unit: that allows a superior stain-removing action and replaces the use of a pre-treating agent or of a wash additive. In addition thereto, it is possible to perform a refreshing wash of the items of animal-origin material (wool, silk)—by using for example the second surfactant-based component—without necessarily damaging them with the use of enzymes, which are essential only in the presence of stains of organic origin.

The washing formulation of the first component is instead characterised by the predominant presence of anionic surfactants, highly active on plant-origin fibres, which explicate the effectiveness peak thereof at medium-high temperatures, for example at 60° C. Such formulation can furthermore be additioned with oxygen-based brighteners, to increase the effectiveness on oxidisable stains and with optical brighteners to obtain maximum emphasis of whiteness.

The washing formulation of the second component is characterised by the predominant presence of non-ionic surfactants, which explicate their maximum effectiveness at temperatures ranging between 15° and 30° C. It can be additioned with colour-stabilising components and plant proteins to improve overall the hydration of the animal-origin fibres as well as with ingredients for odour removal in order to allow an optimal wash of synthetic and technical items.

The formulations of the individual separate components of the washing composition of the invention will now be illustrated in greater detail.

Component 1

Component 1 is a concentrated detergent base which explicates its maximum effectiveness at temperatures equal to or above 40° C. The surfactant system with detergent effect mainly consists of a mixture of anionic and non-ionic surfactants, in an overall amount ranging between 20% and 50% of active agent. The mixture must contain anionic and non-ionic surfactants in ratios of active agent ranging between 75:25 and 50:50. In the context of this application, reference is made to the amount of active agent, because surfactants (or other substances being considered) are typically made available on the market carried and diluted in water or other agents, such as alcohols or glycols, considered a "non-active" component for the detergent purpose.

In order to allow maximum effectiveness, the active agent being equal, on items of cellulose fibres and across a wide spectrum of stains, the mixture must preferably consist of a combination of at least four different molecules.

The types of preferred anionic surfactants belong to the group consisting of alkyl benzene sulphonates, alkyl ether sulphates and alkyl sulphates.

Preferred alkyl benzene sulphonates have an alkylic chain ranging between C10 and C15 and are commercially available under the trade names TENSARIL™ (manufactured by KLM Oleo), SOLPHODAC™ (manufactured by SASOL), MARLON™ (manufactured by SASOL) and CAFLON™ (manufactured by UNIVAR). Alkyl benzene sulphonates are typically inserted in the formulation in their acidic form and are neutralised in situ with strong bases such as sodium hydroxide, monoethanol amine or triethanol amine. The addition of such bases also has the function of adjusting the pH of the formulation to the desired value.

Among alkyl ether sulphates surfactants with a chain length ranging between C10 and C16 and ethoxylation moles ranging between 1 and 3 are preferred. Examples of usable raw materials are commercially available under the trade names ZETESOL™ (manufactured by Zschimmer & Schwarz), EMPICOL™ (manufactured by INNOSPEC), TENSAGEX™ (manufactured by KLM Oleo).

The surfactant mixture can furthermore contain an alkyl sulphate with an alkylic chain ranging between C10 and C16 available on the market under the trade names SULFOPON™ (manufactured by BASF), SULFETAL™ (manufactured by Zschimmer & Schwarz), STEPANOL™ (manufactured by STEPAN).

Among non-ionic surfactants, both primary and secondary ethoxylated fat alcohols are preferred, with an ethoxylation degree above or equal to 7 moles and alkylic chains ranging between C10 and C18 commercially available, for example, under the trademarks LUTENSOL™ (manufactured by BASF), CAFLON™ (manufactured by UNIVAR) or EMPILAN™ (manufactured by INNOSPEC).

Other non-ionic surfactants may be chosen among the categories of alkyl-polyglucosides or alkyl-polypentosides.

To the surfactant mixture, soap can finally be added in a concentration of active agent ranging between 1 and 10%. Preferred soaps are obtained from olive oil and coconut oil.

To the above-described surfactant mixture, other types of surfactants can be added, in order to stabilise the viscosity or the foaming power thereof, but such additional surfactants have no significant effect on the improvement of washing performances on cellulose-origin fibres.

The mixture must furthermore be additioned, in a way compliant with the washing formulations according to the known art, with chelating molecules, sequestrants and solvents.

In order to improve washing effectiveness, polymers with a dispersing, anti-resedimenting and dirt-removing function should furthermore be introduced. Such components can be chosen among the products available on the market under the trademark SOKALAN™ (manufactured by BASF), TEXCARE™ (manufactured by CLARIANT) or REPEL-O-TEX™ (manufactured by SOLVAY). Such components can range in the formulation in percentages between 2 and 10%.

Given the primary destination of component 1 for the use on fabrics made of white cellulose fibres, the formula is enriched with an optical brightener which is preferably chosen among the derived products of 4,4'-Distyryl biphenyl (DSBP) such as, for example, those offered on the market under the trademark TINOPAL™ (manufactured by BASF). The concentration of such raw material ranges between 0.05% and 1%.

The formulation is completed with water and in the mixture other functional ingredients may be contained such as fragrances, rheological modifiers, preservatives and colourings.

In the formulation of component 1 hydrogen peroxide can finally also be additioned, in order to increase the brightening action on oxidisable stains and obtain also a specific sanitising action. PH adjusters of an acidic type are essential in this case for maintaining the pH level between about 4 and about 12.

Component 2

Component 2 is a concentrated detergent base active at low temperatures, characterised by extreme soft action on animal-origin fibres such as wool and silk.

Like component 1, also component 2 is based on a mixed surfactant system of anionic and non-ionic surfactants in an overall amount ranging between 30% and 60% of active agent. Anionic surfactants, despite not explicating their maximum effectiveness at low temperatures, are useful for stabilising the hyper-concentrated formulation. The mixture must hence contain anionic and non-ionic surfactants in a proportion of active agent ranging between 25:75 and 50:50.

The anionic surfactants used in component 2 are chosen among the same categories already cited in component 1. The Applicant has observed, however, that the full removal of anionic surfactants of the alkyl sulphate and alkyl ether sulphate categories and the replacement thereof with sulphonated olefins improves in a clearly perceptible manner (as experimentally verified through a consumer panel test) the softness and elasticity of the items and avoids felting by chemical dehydration of the wool. For example, usable sulphonated olefins can be chosen among the product ranges under the trademark HOSTAPUR™ (manufactured by CLARIANT), WEYLCLEAN (manufactured by WEYL-CHEM) or MERSOLAT™ (manufactured by LANXESS).

Preferred non-ionic surfactants for this component, as for component 1, are both primary and secondary ethoxylated fat alcohols, with an ethoxylation degree above or equal to 7 moles and alkylic chains ranging between C10 and C18, commercially available for example under the trademarks LUTENSOL™ (manufactured by BASF), CAFLON™ (manufactured by UNIVAR), EMPILAN™ (manufactured by INNOSPEC) and in any case alkylpolyglucosides.

The Applicant has furthermore verified that the preferable use of glucamides, in combination with olefins, aids the maintenance of the softness of woolen fibres.

Preferably, the formulation furthermore contains disodium capriloyl glutamate, in a concentration of the active agent ranging between 1% and 5%, which explicates a bacteriostatic and adjuvant function of the removal of odour deriving from sweat and other body fluids.

As for component 1, the mixture of component 2 should preferably be additioned with chelating and sequestering molecules.

In order to improve washing effectiveness, polymers should furthermore be preferably introduced having dispersing, anti-resedimenting and dirt-removing function, selectable across the same range of commercial products indicated for component 1; also concentrations of use are comparable and ranging between 2 and 10%.

Component 2 is indicated in a preferential manner for the washing treatment of coloured items and is hence furthermore integrated with additives having colour anti-transfer function. Valid solutions can be chosen among the derivatives of polyvynylpirrolidon, derivatives of cationic aliphatic polyamines, for example the ones commercially available under trademarks SOKALAN™ (manufactured by BASF), TEXCARE™ (manufactured by CLARIANT), REILLINE™ (manufactured by VERTELLUS).

The formulation is completed with water and other functional ingredients such as solvents, fragrances, rheological modifiers, preservatives, colourings and pH adjusters can be contained in the mixture.

Component 3

In this component, as indicated above, an enzyme charge is substantially contained. The enzyme base of the charge contains a mixture of enzymes which are fundamental for guaranteeing the stain-removing power (in particular on stains of organic origin) of the washing composition of the invention. The mixture typically contains at least a protease, an amylase and a lipase. The base may furthermore preferably contain a cellulase and/or a mannanase.

The mixture must be stable in conditions of temperature up to 40° C., hence over 37° C., at which temperature enzyme stabilities are tested by enzyme manufacturers. This is because housing the containers in the proximity of the porthole can expose the mixture, in case of high-temperature washes, to a rise of the inner temperature of the liquid, accelerating enzyme disgregation.

Among proteases, the use of subtilisin in this application is particularly recommended; only some types, in particular provided by manufacturers in a previously not stabilised form, allow to obtain maximum stability upon time of component 3. As a matter of fact, if the raw material already contains stabilising active ingredients, it is not possible to find an overall balance of mutual stability among all the necessary enzymes, negatively affecting washing effectiveness.

In particular, it has been defined as optimal a result of experimental accelerated stability which allows, after conditioning at 40° C. for 12 weeks a loss of effectiveness below 20%.

The experimental research which has led to the present invention has proven that the stable coexistence of these enzymes in the same formulation, in particular between protease and lipase, is optimal when the pH is maintained between 4 and 6 or even better between 5 and 6.

For an optimal stabilisation it has been detected that it is necessary to carefully select the possible subtilisin enzymes available; such selection has been carried out taking in consideration the co-formulants of the enzyme introduced in the commercial raw material by the manufacturer, the specific stain-removing effectiveness and the degradation power imparted onto lipase. As a matter of fact, in the absence of an adequate mixing of the enzymes, at these pH levels compatibility problems arise among the enzymes, which determine the instability thereof upon time and loss of effectiveness.

Empirical washing tests at zero time and at accelerated aging periods at 40° C. up to 12 weeks, with specific monitoring of stains of blood, grass, cocoa, olive oil and sebum, have highlighted that the maximum stability and effectiveness are obtained accomplishing the mixture preferably with the enzymes of the subtilisin type commercially available under the trade names Preferenz™ P100 (available from DU PONT) or LAVERGY™ PRO 104 L (available from BASF) wherever enzymes even of more recent immission onto the market, and better performing in conventional detergent applications, prove to deteriorate much faster.

Protease in the formulation can be contained up to 3% of active enzyme protein (aep, as an acronym) preferably up to 2% aep.

In addition to protease, the formulation contains a lipase chosen among the commercially available ones, for example under the trade names LIPEX™ and LIPEX EVITY™ available from NOVOZYMES and PREFERENZ™ L available from DU PONT. The formulation can contain lipase up to 1% aep.

In addition to protease and lipase, the formulation of the third component can contain also an amylase enzyme chosen among the commercially available ones, for example under the trade names AMPLYFY PRIME, STAINZYME, TERMAMYL™, TERMAMYL ULTRA™ available from NOVOZYMES, and PREFERENZ™ S available from DU PONT. The formulation can contain amylase up to 1% aep preferably up to 0.5% aep. In addition the system can also contain a cellulase and a mannanase, both in a concentration up to 0.5% aep.

The formulation of the third component is finally stabilised by adding polyols, such as preferably a glycerol or even better a sorbitol, and a salt chosen between calcium chloride and formate sodium. The choice of the stabilising system must rule out the use of monopropylen glycol (MPG) from the formulation. The MPG non intentionally added in the formulation, but deriving from secondary ingredients of the commercially available raw materials must not be above 10% of the active agent. As a matter of fact, it has been detected that MPG concentrations overall above 10% give origin to a chemical-physical instability of the solution, which results in cloudy mixture and to a precipitation of denatured enzymes with resulting dramatic loss of stain-removing effectiveness.

Component 4

The fourth component of the washing composition of the invention is a product for fibre conditioning, studied to increase the softness of natural fibre items and strongly reducing the static cling of synthetic items. The formulation of this component typically contains at least a cationic surfactant, preferably of the estherquat category. Such surfactant can be additioned with polypropylen glycol or alcohol. The cationic surfactant can be present in concentrations ranging in the interval between 5% and 20% of active agent.

Lactic acid in a concentration up to 2% may be optionally added to the formulation, in order to adjust pH and emulsion stability. The addition of lactic acid imparts bacteriostaticity to the product and avoids the addition of further preservatives.

According to the invention, it is preferably provided to add a functionalised inulin polymer to component 4, to increase the softness of the items and remove roughness of cellulose fibres to an appreciable degree, allowing to achieve a result comparable to inulin-free formulations having a 20% higher concentration of the cationic surfactant. Since an excessively high concentration of cationic surfactant on fabric fibres implies, as undesired side effects, excessive oiliness and resulting water repellency (annoying especially on items meant for water absorption such as hand towels and bathrobes) the opportunity of limiting the dosing of the cationic surfactant, adding the functionalised inulin derivatives results in an appreciable improvement of the sensory appearance of the washed and conditioned items. Inulin is dosed in component 4 in an amount ranging in the interval between 0.2% and 2% of active agent and can be chosen among the products available on the market under the trademark QUATIN® (manufactured by ROYAL COSUN).

It is known that some hydrolised or functionalised plant-based proteins deriving from wheat and silk, when added in an amount of active raw material ranging between 0.1% and 3%, explicate a softening action on textile fibres, better than lanolin. The Applicant, however, has verified that the use of plant-based protein deriving from rice used in the state-of-the-art only in the cosmetic sector, in addition to having an effect on hydration and softness of cheratinic fibres, allows an improvement (which can be clearly highlighted by a consumers' panel test) also of the hydration of the cellulose fibres and of the relaxation of silk and cotton fibres, aiding ironing of the items. These plant-based proteins derived from rice are dosed in the formulation in an amount of active agent ranging in the interval between 0.2% and 3.0% and can be chosen among commercially available products, for example the ones under the trademark GLUADIN® (manufactured by BASF) and ORYSOL™ (manufactured by KELISEMA).

Treatment with component 4 of the items manufactured with animal fibres, at the end of the washing operation, opposes the dehydration normally caused by the washing process and reduces fibre aging due to wear.

The formulation of component 4 can also contain secondary active agents such as silicons, enzymes of the cellulase category and odour-neutralising active ingredients.

Dosing of the Separate Components 1-4

The separate components 1-4 described above can be dosed independently during the programme; for each wash cycle at least one of the components 1 and 2 with detergent effect must nevertheless always be dosed, with the optional addition of components 3 and 4 with the criteria reported here below.

In particular, with reference to a standard laundry load of about 4.5 Kg, the dosed amounts of the separate components of the washing composition of the invention are preferably the following ones:

the overall amount of component 1 and of component 2 shall be comprised in the interval between 10 ml and 40 ml;

the amount of component 3 shall be comprised in the interval between 1 and 10 ml;

the amount of component 4 shall be comprised in the interval between 5 and 20 ml.

Components 1, 2 and 3 shall be dosed in the main wash step and can be added to the wash liquid simultaneously or at different steps, depending on the wash programme.

In addition, components 1 and 2 can be dosed also during a pre-wash step. Finally, component 4 shall be dosed in the final rinse.

The composition of the components according to a preferred embodiment, taking into account the relative dosing requirements which on average are detected in the use of washing machines, requires an overall volume below 4 litres, preferably 3.25 litres with volumes thus splitted:

Component 1: 1250 ml
Component 2: 1000 ml
Component 3: 300 ml
Component 4: 700 ml Such choice of volumes allows an optimal distribution of the containers in the housing provided in the electrical household appliance and allows to carry out up to 75 wash cycles avoiding a consumption of the components excessively staggered over time with replenishment difficulties for the user.

EXAMPLES

In the following some preferred examples of the individual liquid wash components according to the present invention are reported in a detailed and schematic way. The complex formulation of the wash composition is then created during the operation cycle of the washing machine, through a process stored onboard the machine which provides to select, dose and deliver the four components according to requirements, in technical ways per se within the reach of a person skilled in the field.

Component 1

Example 1

17% C10-13-sec-alkyl benzene 4-sulphonic acid
2.5% NaOH
8% lauryl sulphate (MEA Lauryl sulphate)
8% ethoxylated fatty alcohol (C13-C15 alcohol, 7EO)
6% ethoxylated fatty alcohol (isotridecanol 8EO)
5% potassium coconutate
5% MMB 2% MGDA (Trilon M liquid)
5% EPEI (Sokalan HP20)
2% fragrance
0.4% optical brightener (Tinopal CBS-X)
Preservative and water as required up to 100%
pH 9.5-10.5

Example 2

20% C10-13-sec-alkyl benzene 4-sulphonic acid
3.9% MEA
5% sodium lauryl ether sulphate, 3EO
10% ethoxylated fatty alcohol (C13-C15 alcohol, 7EO)
8% C10-C16 alkylpolyglucoside
5% potassium coconutate
5% MMB
2% MGDA (Trilon M liquid)
6% EPEI (Sokalan HP20)
2% fragrance
0.4% optical brightener (Tinopal CBS-X)
Preservative and water as required up to 100%
pH 8.5-9.5

Component 2

Example 1

10% C10-13-sec-alkyl benzene 4-sulphonic acid
5.05% TEA
6% C14-17-sec-alkyl sulphonic acid, sodium salt
15% ethoxylated fatty alcohol (C13-C15 branched and linear alcohols, 7EO)
10% D-Glucitol, 1-deoxy-1-(methylamino)-, N-C8-10 acyl derives
5% potassium coconate
5% MMB
0.5% MGDA (Trilon M liquid)
4% EPEI (Sokalan HP20)
2% polyvynylpirrolidon (Sokalan HP56)
2% fragrance
Preservative and water as required up to 100%
pH 8.0-9.0

Example 2

10% C10-13-sec-alkyl benzene 4-sulphonic acid
5.05% TEA
6% C14-17-sec-alkyl sulphonic acid, sodium salt
20% ethoxylated fatty alcohol (C13-C15 alcohol, 7EO)
5% D-Glucitol, 1-deoxy-1-(methylamino)-, N-C8-10 acyl derives
5% disodium capriolyl glutamate
5% potassium coconate
5% MMB
2% MGDA (Trilon M liquid)
2% EPEI (Sokalan HP20)
2% polyvynylpirrolidon (Sokalan HP56)

2% fragrance
Preservative and water as required up to 100%
pH 8.0-8.5

Component 3

Example 1

3% formate sodium
45% sorbitol
2% aep protease (Lavergy PRO 104L)
0.80% aep lipase (Preferenz L100)
0.50% aep amylase (Preferenz S110)
0.03% citric acid
Water as required up to 100%
pH 4.5-5.0

Example 2

3% calcium chloride
45% sorbitol
2% aep protease (Lavergy PRO 104L)
0.60% aep lipase (Lipex evity 100L)
0.45% aep amylase (Amplify prime 100L)
0.30% aep cellulase (Medley Glow 200 L)
0.15% aep mannanase (Mannaway)
0.03% citric acid
Water as required up to 100%
pH 5.0-5.5

Component 4

Example 1

15% Estherquat (TETRANYL L1/90 S)
2% hydrolised rice proteins (ORYSOL)
2% Hydroxypropyl Trimonium Inulin (QUATIN 680 TQ-D)
3% silicon emulsion (Ersil 66)
3% fragrance
0.6% lactic acid (2-hydroxypropanoic acid)
Water as required up to 100%
pH 2.0-3.0

Example 2

20% Esterquat (TETRANYL L1/90 S)
1% hydrolised rice proteins (ORYSOL)
3% hydrolised wheat proteins (COLTIDE™ HSI)
3% silicon emulsion (Ersil 66)
3% fragrance
0.6% lactic acid (2-hydroxypropanoic acid)
Water as required up to 100%
pH 2.0-3.0

The doses of the components may be determined by the logic unit onboard the washing machine in the amounts shown in Table 1 based on the specific requirements of the various wash cycles:

TABLE 1

| | Washing Temperature | Component 1 (ml) | Component 2 (ml) | Component 3 (ml) | Component 4 (ml) |
|---|---|---|---|---|---|
| White tablecloths | 60° C. | 35 | 0 | 7 | 10 |
| Coloured tablecloths | 40° C. | 0 | 35 | 5 | 10 |
| Normally soiled cotton items | 20° C. | | 20 | | 10 |

TABLE 1-continued

|  | Washing Temperature | Component 1 (ml) | Component 2 (ml) | Component 3 (ml) | Component 4 (ml) |
|---|---|---|---|---|---|
| Synthetic fabrics | 30° C. | 12 | 15 | 0 | 0 |
| Technical/sports fabrics | 30° C. | 0 | 15 | 3 | 0 |
| Wool |  | 0 | 18 | 0 | 16 |

As can be understood from the description provided above, the splitting into the four components and the specific formulation of each component allows to obtain a highly effective wash composition and to achieve the objects set forth in the preliminary remarks.

As a matter of fact, with such a bulk as to efficiently occupy the circular-sector compartment, the suitable components for automatically achieving the most effective wash formulations for multiple types of items are provided. The specific composition of the four components allows to optimise the nature and the amount of the individual formulations, obtaining a long-lasting preservation of the active ingredients, a reduction of waste and environmental pollution in the wash cycles and the least management commitment possible for the user.

Advantageously, the washing composition of the invention can be used with any washing machine equipped with four independent tanks apt to be controlled through a suitable selection, dosing and differentiated delivery programme.

However, it is understood that the invention must not be considered limited to the particular arrangements illustrated above, which make up only exemplifying embodiments thereof, but that different variants are possible, all within the reach of a person skilled in the field, without departing from the scope of protection of the invention, which is exclusively defined by the following claims.

For example, although reference has always been made to more or less thick liquid components, it is not ruled out that the wash composition may also resort, at least in part, to fully dehydrated components, for example in powder or in small grains (hence still fluid, so as to be able to be easily conveyed to the washing chamber of a washing machine).

The invention claimed is:

1. A fluid washing composition with four separate components housed in respective independent tanks of a laundry washing machine equipped with a program for the selection, dosing and differentiated delivery of said separated components according to the varying characteristics of the individual laundry batch, wherein said separate components have the following formulation:
   Component 1—detergent formulation with a pH ranging between 4.0 and 12.0, with high detergent effect in washing programs at temperatures in the range 40°-60° C., having a specific action on cotton fibers;
   Component 2—detergent formulation with a pH ranging between 8.0 and 12.0, with high detergent effect in washing programs at temperatures in the range 15°-40° C., having a specific action on synthetic, colored and animal-origin fibers;
   Component 3—enzyme-based stain-removing formulation based at least on subtilisin-type protease and lipase with a pH ranging between 5.0 and 6.0, stabilised with sorbitol and calcium chloride and having an overall content of monopropylene glycol at most 10% of active agent;
   Component 4—after-wash conditioning formulation, with a pH ranging between 2.0 and 4.0,
   whereby distributing said components across said respective independent tanks, separates component enzymes from surfactants.

2. The washing composition as in claim 1, wherein said component 1 consists of a mixture of anionic and non-ionic surfactants in active-agent proportions ranging between 75:25 and 50:50, wherein said anionic surfactants are chosen among alkyl benzen sulphonates, alkyl ether sulphates and alkyl sulphates and said non-ionic surfactants are chosen among both primary and secondary ethoxylated fatty alcohols, alkyl-polyglucosides or alkyl-polypentosides.

3. The washing composition as in claim 2, containing surfactants in an amount in the range 20%-50% of active agent, soaps in an amount in the range 1%-10% of active agent, miscellaneous additives with a stabilising, dispersing, anti-resedimenting and dirt-removing function, overall in an amount in the range 2%-10% of active agent, oxidising brighteners and optical brighteners in an amount in the range 0.05%-1% of active agent and water up to 100%.

4. The washing composition as in claim 1, wherein said component 2 consists of a mixture of anionic and non-ionic surfactants in active agent proportions ranging between 25:75 and 50:50, wherein said anionic surfactants are chosen among alkyl benzen sulphonates and sulphonated olefins, and said non-ionic surfactants are chosen among both primary and secondary ethoxylated fatty alcohols with an ethoxylation degree above or equal to 5 moles and alkylic chains ranging between C10 and C18.

5. The washing composition as in claim 4, containing surfactants in an amount ranging between 30% and 60% of active agent, additives with bacteriostatic function and adjuvating the odour removal in an amount ranging between 1% and 5% of active agent, miscellaneous additives with a stabilising, dispersing, anti-resedimenting and dirt-removing function, overall in an amount in the range 2%-10% of active agent, and water up to 100%.

6. The washing composition of claim 4, wherein said anionic surfactants further comprise glucamides.

7. The washing composition as in claim 1, wherein said component 3 consists of a mixture of enzymes comprising at least a protease, a lipase and an amylase.

8. The washing composition as in claim 7, wherein in component 3 the contents of said protease is up to 3% aep, the contents of said lipase is up to 1% aep, the contents of said amylase is up to 0.5% aep and any contents of said cellulase and mannanase is up to 0.5% aep each.

9. The washing composition as in claim 1, wherein said component 4 comprises a cationic surfactant of the esterquat category.

10. The washing composition as in claim 9, wherein component 4 contains said cationic surfactant in an amount in the range from 5% to 20% of active agent, a bacteriostatic additive based on lactic acid in an amount in the range up to 2% of active agent, an inulin-based softening additive in an amount in the range from 0.2% to 2% of active agent, a softening additive based on rice proteins in an amount in the range from 0.4% to 3% of active agent and water up to 100%.

11. The washing composition of claim 9, wherein said component 4 further comprises propylene glycol or alcohol.

12. The washing composition as in claim 1, wherein said components from 1 to 4 are arranged in respective tanks with volume ratios from 5:4:1:2 to 4:3:1:3.

13. A laundry washing kit comprising four separate cartridges containing respective washing components, wherein
said components make up a washing composition as in claim 1 and wherein
said components from 1 to 4 are distributed in said cartridges with volume ratios from 5:4:1:2 to 4:3:1:3.

14. A washing method in a laundry washing machine, comprising a washing step with detergent, wherein dosed amounts of washing components are delivered into a washing chamber starting from a plurality of separate cartridges of said components, wherein said cartridges are housed in a compartment defined by a porthole of said washing machine and contain components which make up a washing composition as in claim 1.

15. The washing composition of claim 1, wherein said Component 3 further comprises amylase and has a pH between 5.0 and 5.5.

16. The washing composition of claim 1, wherein said component 3 consists of a mixture of enzymes comprising at least a protease, a lipase and an amylase, and a cellulase and/or a mannanase.

\* \* \* \* \*